(12) United States Patent
Jeong

(10) Patent No.: US 11,584,442 B2
(45) Date of Patent: Feb. 21, 2023

(54) VEHICLE IMPACT ENERGY ABSORPTION SYSTEM

(71) Applicants: Hyundai Motor Company, Seoul (KR); Kia Corporation, Seoul (KR)

(72) Inventor: Seung Min Jeong, Hwaseong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 113 days.

(21) Appl. No.: 17/358,724

(22) Filed: Jun. 25, 2021

(65) Prior Publication Data
US 2022/0081037 A1 Mar. 17, 2022

(30) Foreign Application Priority Data
Sep. 16, 2020 (KR) .................. 10-2020-0119041

(51) Int. Cl.
| | | |
|---|---|---|
| *B60J 7/00* | (2006.01) | |
| *B62D 21/15* | (2006.01) | |
| *B62D 25/14* | (2006.01) | |
| *B60K 1/00* | (2006.01) | |
| *B62D 21/03* | (2006.01) | |
| *B62D 25/20* | (2006.01) | |

(52) U.S. Cl.
CPC .............. *B62D 21/155* (2013.01); *B60K 1/00* (2013.01); *B62D 21/03* (2013.01); *B62D 25/14* (2013.01); *B62D 25/2018* (2013.01)

(58) Field of Classification Search
CPC ........ Y02E 60/10; H04L 5/0007; Y02P 70/50; A61K 31/517; A61P 35/00; A61P 9/10; A61P 29/00; A61P 43/00; B60K 23/0808
See application file for complete search history.

(56) References Cited

U.S. PATENT DOCUMENTS

| | | | |
|---|---|---|---|
| 2018/0370568 A1* | 12/2018 | Ayukawa | ................ B60L 53/22 |
| 2020/0079202 A1* | 3/2020 | Suzuki | ............... H02K 11/0094 |
| 2020/0101879 A1* | 4/2020 | Sakai | ...................... B60N 2/015 |
| 2020/0254885 A1* | 8/2020 | Park | ...................... B62D 21/11 |
| 2021/0179178 A1* | 6/2021 | Jeong | ..................... B62D 25/04 |
| 2022/0033003 A1* | 2/2022 | Kim | ................... B62D 25/2018 |
| 2022/0097767 A1* | 3/2022 | Jeong | ................... B62D 25/082 |
| 2022/0169312 A1* | 6/2022 | Park | ....................... B62D 25/14 |

FOREIGN PATENT DOCUMENTS

JP 2010091096 A 4/2010

\* cited by examiner

*Primary Examiner* — Kiran B Patel
(74) *Attorney, Agent, or Firm* — Slater Matsil, LLP

(57) ABSTRACT

An embodiment vehicle impact energy absorption system includes a dash panel, a pair of front side members extending toward a front of the dash panel, a front subframe disposed below the pair of front side members, and an electric motor mounted on the front subframe, wherein a front edge of the electric motor is pivotally connected to the front subframe, and a rear edge of the electric motor is pivotally connected to the dash panel.

20 Claims, 4 Drawing Sheets

VEHICLE IMPACT ENERGY ABSORPTION SYSTEM

CROSS-REFERENCE TO RELATED APPLICATIONS

This application claims the benefit of priority to Korean Application No. 10-2020-0119041, filed on Sep. 16, 2020, which application is hereby incorporated herein by reference.

TECHNICAL FIELD

The present disclosure relates to a vehicle impact energy absorption system.

BACKGROUND

In recent years, as the perception of environmental crisis and depletion of oil resources has increased, research and development of eco-friendly electric vehicles have actively been conducted. Electric vehicles include plug-in hybrid electric vehicles (PHEVs), battery electric vehicles (BEVs), fuel cell electric vehicles (FCEVs), etc.

An electric vehicle includes an electric motor provided in a front compartment of the vehicle and a battery assembly mounted to a floor of the vehicle. The electric motor may drive front wheels of the vehicle, and the battery assembly may supply electricity to the electric motor and other electric/electronic components. The battery assembly includes one or more battery cells (or battery modules), electric/electronic components associated with the battery cells, a battery case in which the battery cells and the electric/electronic components are received, and a cover with which the top of the battery case is covered.

In the battery assembly of the electric vehicle, leakage of a coolant from a cooling line due to external impacts or interference between the battery cells may cause a fire. In order to safely protect the battery assembly even in the event of a vehicle impact/collision, battery protection law (regulations) has been established. An internal combustion engine vehicle only considers the absorption of impact energy, but the electric vehicle must consider not only the absorption of impact energy, but also the protection of the battery assembly according to the battery protection law.

The capacity of the battery assembly increases in order to increase the range of the electric vehicle. Accordingly, as the size of the battery assembly increases, the battery assembly may protrude toward the front of the vehicle. Thus, it is necessary to consider the protection of the battery assembly more important in designing the vehicle.

In a conventional electric vehicle, the electric motor is rigidly mounted between a chassis and a front subframe, so the electric motor and the front subframe serve as rigid bodies in the event of a vehicle impact/collision, thereby significantly reducing an energy absorption amount of the front subframe. The front subframe is likely to strike a front end portion of the battery assembly. As a result, the battery assembly may not be safely protected.

The above information described in this background section is provided to assist in understanding the background of the inventive concept, and may include any technical concept which is not considered as the prior art that is already known to those skilled in the art.

SUMMARY

The present disclosure relates to a vehicle impact energy absorption system. Particular embodiments relate to a vehicle impact energy absorption system capable of protecting a battery assembly and absorbing impact energy in the event of a vehicle impact/collision. Embodiments of the present disclosure can solve problems occurring in the prior art while advantages achieved by the prior art are maintained intact.

An embodiment of the present disclosure provides a vehicle impact energy absorption system that causes a front subframe and/or an electric motor to rotate toward the bottom of the vehicle in the event of a vehicle impact/collision, thereby preventing the front subframe from colliding with a battery assembly, and maximizing the distribution and absorption of impact energy.

According to an embodiment of the present disclosure, a vehicle impact energy absorption system may include a dash panel, a pair of front side members extending toward the front of the dash panel, a front subframe disposed below the pair of front side members, and an electric motor mounted on the front subframe. A front edge of the electric motor may be pivotally connected to the front subframe, and a rear edge of the electric motor may be pivotally connected to the dash panel.

The rear edge of the electric motor may be pivotally connected to the dash panel through a rear pivot connection.

The rear pivot connection may include a rear pivot arm protruding from the rear edge of the electric motor toward the dash panel, a pivot bracket protruding from the dash panel toward the electric motor, and a rear pivot pin extending through the rear pivot arm and the pivot bracket.

The pivot bracket may include a top wall facing the top of the vehicle, a pair of sidewalls extending from both edges of the top wall toward the bottom of the vehicle, and a bottom opening opposing the top wall, and the rear pivot pin may extend through the pair of sidewalls and the rear pivot arm.

The vehicle impact energy absorption system may further include a transverse reinforcement attached to a bottom portion of the dash panel, and the transverse reinforcement may extend along a width direction of the vehicle.

The rear pivot connection may be aligned with the center of the transverse reinforcement.

The vehicle impact energy absorption system may further include a longitudinal reinforcement extending from the transverse reinforcement toward the rear of the vehicle. The longitudinal reinforcement may extend along a longitudinal direction of the vehicle, and the longitudinal reinforcement may be attached to a top surface of a floor panel.

The vehicle impact energy absorption system may further include a front crossmember attached to the top surface of the floor panel, and the front crossmember may be located behind the transverse reinforcement.

A front end of the longitudinal reinforcement may be joined to the center of the transverse reinforcement, and a rear end of the longitudinal reinforcement may be joined to the center of the front crossmember.

The front edge of the electric motor may be pivotally connected to a front crossmember of the front subframe through a pair of front pivot connections.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
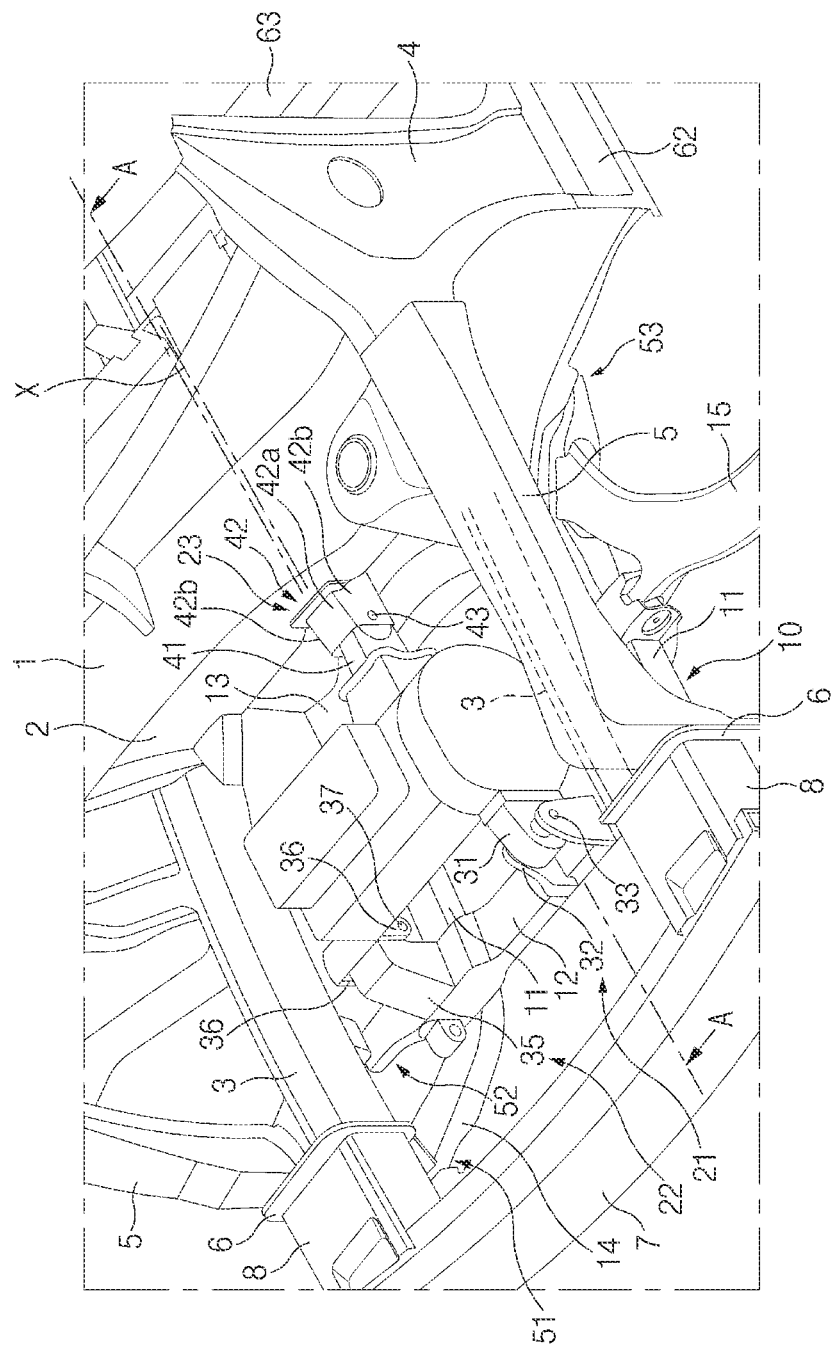
FIG. 1 illustrates part of a vehicle impact energy absorption system according to an exemplary embodiment of the present disclosure, which is located in front of a dash panel.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates part of a vehicle impact energy absorption system according to an exemplary embodiment of the present disclosure, which is located in front of a dash panel or a fire wall 2. The dash panel 2 may serve as a partition that separates a front compartment from a passenger compartment, and an electric motor, a transmission, a heat exchanger, and the like may be disposed in the front compartment.

Referring to FIG. 1, a cowl panel 1 may be mounted on the top of the dash panel 2, and a pair of front pillars 4 may be mounted on both edges of the dash panel 2. A pair of front side members 3 may extend toward the front of the dash panel 2. The pair of front side members 3 may be spaced apart from each other in a width direction of the vehicle, and each front side member 3 may extend in a longitudinal direction of the vehicle. Each front side member 3 may extend through a bottom portion of the dash panel 2. A pair of fender apron members 5 may be spaced apart from each other in the width direction of the vehicle, and each fender apron member 5 may extend from the corresponding front pillar 4 to a front end of the corresponding front side member 3. Both ends of a front bumper beam 7 may be mounted on a pair of bumper beam mounting brackets 6 through a pair of crash boxes 8. A front end of the fender apron member 5 and the front end of the front side member 3 may be mounted on the corresponding bumper beam mounting bracket 6 by welding, using fasteners, and/or the like.

Figure 3:
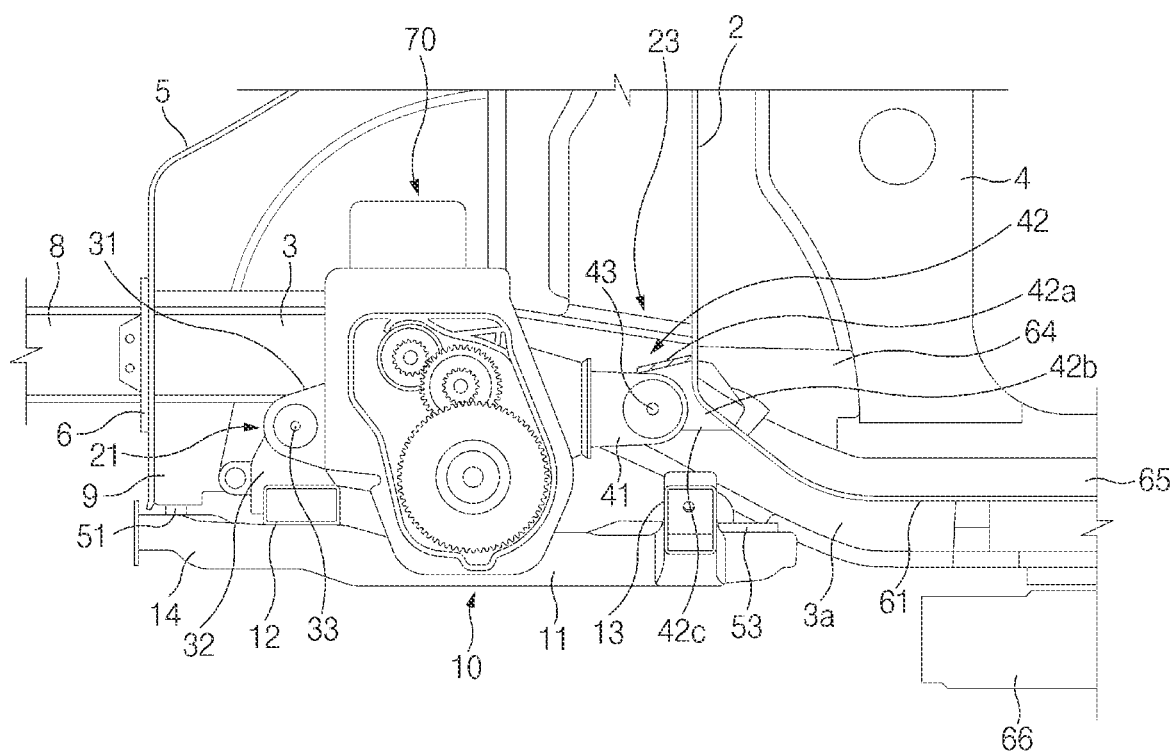
FIG. 3 illustrates a cross-sectional view, taken along line A-A of FIG. 1.

Referring to FIGS. 1 and 3, a front subframe 10 may be disposed below the pair of front side members 3. The front subframe 10 may include a pair of longitudinal members 11, a front crossmember 12 connecting front portions of the pair of longitudinal members 11, a rear crossmember 13 connecting rear portions of the pair of longitudinal members 11, and a pair of front extension portions 14 extending from the pair of longitudinal members 11, respectively. Each longitudinal member 11 may extend in the longitudinal direction of the vehicle, and the longitudinal member 11 may be disposed below the corresponding front side member 3. The front crossmember 12 and the rear crossmember 13 may extend in the width direction of the vehicle, and the front extension portion 14 may extend from the longitudinal member 11 toward the front of the vehicle. The front subframe 10 may include a pair of lower control arms 15 connected to the pair of longitudinal members 11, respectively.

Referring to FIG. 3, a pair of subframe mounting brackets 9 may be attached to the pair of bumper beam mounting brackets 6, respectively. Each front side member 3 may have a rear extension portion 3a extending toward the rear of the vehicle, and the rear extension portion 3a may be curved from a rear end of the front side member 3 toward the rear of the vehicle. The rear extension portion 3a may be a torque box connecting the front side member 3 and a corresponding side sill (not shown).

Referring to FIGS. 1 and 3, the front subframe 10 may include a pair of front mounting portions 51 mounted on the pair of subframe mounting brackets 9, a pair of central mounting portions 52 mounted on central portions of the pair of front side members 3, and a pair of rear mounting portions 53 mounted on the rear extension portions 3a of the pair of front side members 3.

Referring to FIG. 1, an electric motor 70 may be mounted on the front subframe 10. A front edge of the electric motor 70 may be pivotally connected to the front subframe 10, and a rear edge of the electric motor 70 may be pivotally connected to the dash panel 2.

According to an exemplary embodiment, the front edge of the electric motor 70 may be connected to the front subframe 10 through one or more front pivot connections 21 and 22. Specifically, the front edge of the electric motor 70 may be pivotally connected to the front crossmember 12 of the front subframe 10 through a first front pivot connection 21 and a second front pivot connection 22, and the first front pivot connection 21 and the second front pivot connection 22 may be spaced apart from each other in the width direction of the vehicle. As illustrated in FIG. 1, the first front pivot connection 21 may be adjacent to the left side of the vehicle, and the second front pivot connection 22 may be adjacent to the right side of the vehicle.

The first front pivot connection 21 may include a first front pivot arm 31 protruding from the front edge of the electric motor 70 toward the front crossmember 12 of the front subframe 10, a pair of first front pivot lugs 32 protruding upwardly from the front crossmember 12 of the front subframe 10, and a first front pivot pin 33 extending through the first front pivot arm 31 and the pair of first front pivot lugs 32. The first front pivot arm 31 may be received between the pair of first front pivot lugs 32, and the first front pivot pin 33 may extend through the pair of first front pivot lugs 32 and the first front pivot arm 31.

The second front pivot connection 22 may include a second front pivot arm 35 protruding from the front crossmember 12 of the front subframe 10 toward the electric motor 70, a pair of second front pivot lugs 36 protruding downwardly from the front edge of the electric motor 70, and a second front pivot pin 37 extending through the second front pivot arm 35 and the pair of second front pivot lugs 36. The second front pivot arm 35 may be received between the pair of second front pivot lugs 36, and the second front pivot pin 37 may extend through the pair of second front pivot lugs 36 and the second front pivot arm 35.

Figure 4:
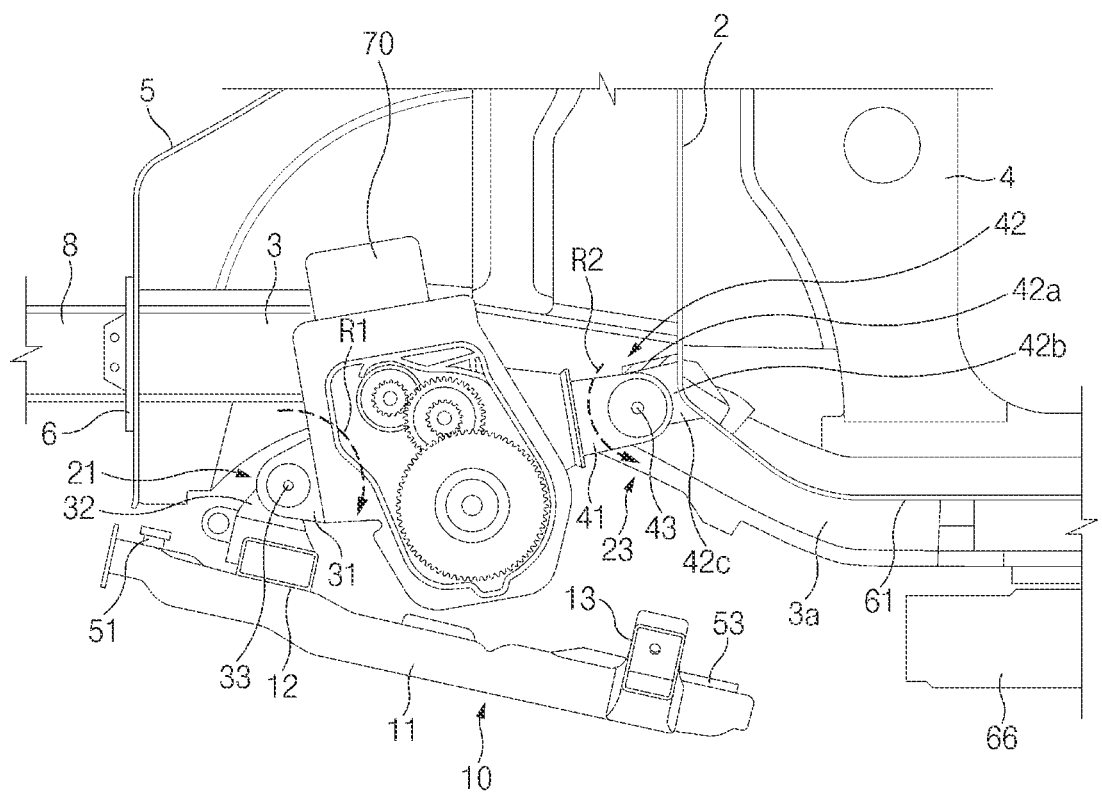
FIG. 4 illustrates the rotation of a subframe and an electric motor in the event of a vehicle impact/collision.

In the event of a frontal impact/collision of the vehicle, the first front pivot lugs 32 may rotate around the first front pivot pin 33 and the second front pivot arm 35 may rotate around the second front pivot pin 37 as illustrated in FIG. 4, and thus the front subframe 10 may rotate toward the bottom of the vehicle (see a direction indicated by arrow R1 in FIG. 4).

According to an exemplary embodiment, the rear edge of the electric motor 70 may be pivotally connected to the dash panel 2 through a rear pivot connection 23. Specifically, the rear pivot connection 23 may include a rear pivot arm 41 protruding from the rear edge of the electric motor 70 toward the dash panel 2, a pivot bracket 42 protruding from the dash panel 2 toward the electric motor 70, and a rear pivot pin 43 extending through the rear pivot arm 41 and the pivot bracket 42. The pivot bracket 42 may include a top wall 42a facing the top of the vehicle, a pair of sidewalls 42b extending from both edges of the top wall 42a toward the bottom of the vehicle, and a bottom opening 42c opposing the top wall 42a. The bottom opening 42c may be open to the bottom of the vehicle. The rear pivot arm 41 may be received between the top wall 42a and the pair of sidewalls 42b of the pivot bracket 42, the rear pivot pin 43 may extend through the pair of sidewalls 42b and the rear pivot arm 41, and the rear pivot connection 23 may be disposed on the center of the dash panel 2. In particular, the rear pivot connection 23 may be disposed on a central longitudinal axis X of the vehicle.

In the event of a frontal impact/collision of the vehicle, when the rear pivot arm 41 rotates around the rear pivot pin 43, the rear pivot arm 41 may rotate toward the bottom of the vehicle through the bottom opening 42c of the pivot bracket 42 as illustrated in FIG. 4, and thus the electric motor 70 may rotate toward the bottom of the vehicle through the rear pivot pin 43 of the rear pivot connection 23 (see a direction indicated by arrow R2 in FIG. 4).

Figure 2:
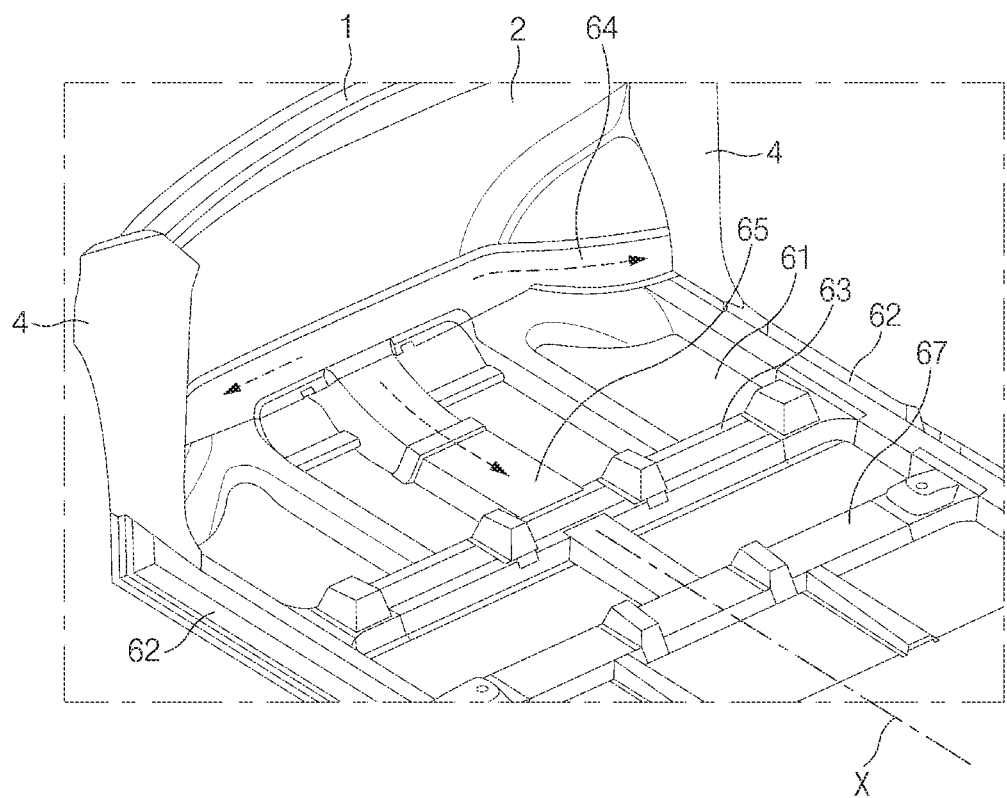
FIG. 2 illustrates part of a vehicle impact energy absorption system according to an exemplary embodiment of the present disclosure, which is located behind a dash panel.

FIG. 2 illustrates part of a vehicle impact energy absorption system according to an exemplary embodiment of the present disclosure, which is located behind the dash panel 2. A floor panel 61 may be connected to a bottom end of the dash panel 2, and a pair of inner side sills 62 may be joined to both edges of the floor panel 61. Each inner side sill 62 may extend in the longitudinal direction of the vehicle.

A transverse reinforcement 64 may be attached to the bottom portion of the dash panel 2, and the transverse reinforcement 64 may be adjacent to a front end of the floor panel 61. The rear pivot connection 23 may be aligned with the center of the transverse reinforcement 64. The transverse reinforcement 64 may extend along the width direction of the vehicle. As end portions of the transverse reinforcement 64 are joined to the corresponding front pillars 4 by welding, using fasteners, and/or the like, the transverse reinforcement 64 may connect the pair of front pillars 4 along the width direction of the vehicle. Thus, the transverse reinforcement 64 may serve as a load path through which a load is transferred in the width direction of the vehicle.

The transverse reinforcement 64 may have a channel-shaped cross-section which is open to the dash panel 2. As the transverse reinforcement 64 is joined to a front surface or rear surface of the dash panel 2 by welding, using fasteners, and/or the like, the transverse reinforcement 64 may have a closed cross-sectional shape. In an exemplary embodiment, the transverse reinforcement 64 may be attached to the rear surface of the dash panel 2 as illustrated in FIG. 2. In another exemplary embodiment, the transverse reinforcement 64 may be attached to the front surface of the dash panel 2.

A longitudinal reinforcement 65 may extend from the transverse reinforcement 64 toward the rear of the vehicle, and the longitudinal reinforcement 65 may extend along the longitudinal direction of the vehicle. Thus, the longitudinal reinforcement 65 may serve as a load path through which a load is transferred in the longitudinal direction of the vehicle.

The longitudinal reinforcement 65 may have a channel-shaped or tunnel-shaped cross-section which is open to the floor panel 61. As the longitudinal reinforcement 65 is joined to a top surface of the floor panel 61 by welding, using fasteners, and/or the like, the longitudinal reinforcement 65 and the floor panel 61 may have a closed cross-sectional shape. A front crossmember 63 may be attached to the top surface of the floor panel 61 by welding, using fasteners, and/or the like, and the front crossmember 63 may be located behind the transverse reinforcement 64. The front crossmember 63 may extend along the width direction of the vehicle, and the front crossmember 63 may be adjacent to the front end of the floor panel 61. As end portions of the front crossmember 63 are joined to the corresponding inner side sills 62 by welding, using fasteners, and/or the like, the front crossmember 63 may connect the pair of inner side sills 62 along the width direction of the vehicle. In addition, a seat crossmember 67 may be located behind the front crossmember 63, and vehicle seats may be mounted on the seat crossmember 67 through mounting brackets. The seat crossmember 67 may connect the pair of inner side sills 62 along the width direction of the vehicle.

A front end of the longitudinal reinforcement 65 may be joined to the center of the transverse reinforcement 64, and a rear end of the longitudinal reinforcement 65 may be joined to the center of the front crossmember 63. As the longitudinal reinforcement 65 is aligned with the pivot bracket 42 in the longitudinal direction of the vehicle, the longitudinal reinforcement 65 and the rear pivot connection 23 may be aligned in the longitudinal direction of the vehicle. In particular, the longitudinal reinforcement 65 and the rear pivot connection 23 may be aligned and extend along the central longitudinal axis X of the vehicle.

During the frontal impact/collision of the vehicle, as the load is transferred to the front side members 3 and the front subframe 10, and the front portion of the front subframe 10 is deformed, the front subframe 10 may rotate toward the bottom of the vehicle through the first and second front pivot connections 21 and 22 (see the direction indicated by arrow R1 in FIG. 4), and thus the rear mounting portion 53 of the front subframe 10 may be completely separated from the rear extension portions 3a of the front side members 3. In addition, when the load is transferred to the electric motor 70, the electric motor 70 may rotate toward the bottom of the vehicle through the rear pivot connection 23 (see the direction indicated by arrow R2 in FIG. 4), and thus the front subframe 10 may be completely separated from the vehicle body. Thus, the front subframe 10 may avoid a collision with a battery assembly 66. In addition, the load to be transferred to the electric motor 70 may pass through the rear pivot connection 23 and be transferred to the longitudinal reinforcement 65 and the transverse reinforcement 64, and thus impact energy may be absorbed.

As set forth above, the vehicle impact energy absorption system according to exemplary embodiments of the present disclosure may cause the front subframe and/or the electric motor to rotate toward the bottom of the vehicle in the event of a vehicle impact/collision, thereby preventing the front subframe from colliding with the battery assembly, and maximizing the distribution and absorption of impact energy. In particular, since the front subframe can avoid colliding with the battery assembly, battery safety and passenger protection may be improved, and the capacity of the battery assembly may be increased compared to the related art battery assembly.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle impact energy absorption system, comprising:
    a dash panel;
    a pair of front side members extending toward a front of the dash panel;
    a front subframe disposed below the pair of front side members; and
    an electric motor mounted on the front subframe, wherein a front edge of the electric motor is pivotally connected to the front subframe, and a rear edge of the electric motor is pivotally connected to the dash panel.

2. The system according to claim 1, wherein the front edge of the electric motor is pivotally connected to a front crossmember of the front subframe through a pair of front pivot connections.

3. The system according to claim 1, wherein the rear edge of the electric motor is pivotally connected to the dash panel through a rear pivot connection.

4. A vehicle impact energy absorption system, comprising:
    a dash panel;
    a pair of front side members extending toward a front of the dash panel;
    a front subframe disposed below the pair of front side members; and
    an electric motor mounted on the front subframe, wherein a front edge of the electric motor is pivotally connected to the front subframe, and a rear edge of the electric motor is pivotally connected to the dash panel through a rear pivot connection, wherein the rear pivot connection comprises:
        a rear pivot arm protruding from the rear edge of the electric motor toward the dash panel;
        a pivot bracket protruding from the dash panel toward the electric motor; and
        a rear pivot pin extending through the rear pivot arm and the pivot bracket.

5. The system according to claim 4, wherein:
    the pivot bracket includes a top wall facing a top of a vehicle, a pair of sidewalls extending from both edges of the top wall toward a bottom of the vehicle, and a bottom opening opposing the top wall; and
    the rear pivot pin extends through the pair of sidewalls and the rear pivot arm.

6. The system according to claim 4, further comprising a transverse reinforcement attached to a bottom portion of the dash panel, wherein the transverse reinforcement extends along a width direction of a vehicle.

7. The system according to claim 6, wherein the rear pivot connection is aligned with a center of the transverse reinforcement.

8. The system according to claim 6, further comprising a longitudinal reinforcement extending from the transverse reinforcement toward a rear of the vehicle, wherein the longitudinal reinforcement extends along a longitudinal direction of the vehicle, and the longitudinal reinforcement is attached to a top surface of a floor panel.

9. The system according to claim 8, further comprising a front crossmember attached to the top surface of the floor panel, wherein the front crossmember is located behind the transverse reinforcement.

10. The system according to claim 9, wherein:
    a front end of the longitudinal reinforcement is joined to a center of the transverse reinforcement; and
    a rear end of the longitudinal reinforcement is joined to a center of the front crossmember.

11. A vehicle comprising:
    a dash panel;
    a floor panel connected to a bottom end of the dash panel;
    a pair of front side members spaced apart from each other in a width direction of the vehicle and extending toward a front of the dash panel;
    a front subframe disposed below the pair of front side members; and
    an electric motor mounted on the front subframe, wherein a front edge of the electric motor is pivotally connected to the front subframe through first and second front pivot connections, and a rear edge of the electric motor is pivotally connected to the dash panel.

12. The vehicle according to claim 11, wherein:
    the first front pivot connection includes a first front pivot arm protruding from the front edge of the electric motor toward a front crossmember of the front subframe, a pair of first front pivot lugs protruding upwardly from the front crossmember of the front subframe, and a first front pivot pin extending through the first front pivot arm and the pair of first front pivot lugs; and
    the second front pivot connection includes a second front pivot arm protruding from the front crossmember of the front subframe toward the electric motor, a pair of second front pivot lugs protruding downwardly from the front edge of the electric motor, and a second front pivot pin extending through the second front pivot arm and the pair of second front pivot lugs.

13. The vehicle according to claim 11, wherein the rear edge of the electric motor is pivotally connected to the dash panel through a rear pivot connection.

14. The vehicle according to claim 13, wherein the rear pivot connection comprises:
    a rear pivot arm protruding from the rear edge of the electric motor toward the dash panel;
    a pivot bracket protruding from the dash panel toward the electric motor; and
    a rear pivot pin extending through the rear pivot arm and the pivot bracket.

15. The vehicle according to claim 14, wherein:
    the pivot bracket includes a top wall facing a top of the vehicle, a pair of sidewalls extending from both edges of the top wall toward a bottom of the vehicle, and a bottom opening opposing the top wall; and
    the rear pivot pin extends through the pair of sidewalls and the rear pivot arm.

16. The vehicle according to claim 14, further comprising a transverse reinforcement attached to a bottom portion of the dash panel, wherein the transverse reinforcement is adjacent to a front end of the floor panel and extends along the width direction of the vehicle.

17. The vehicle according to claim 16, wherein the rear pivot connection is aligned with a center of the transverse reinforcement.

18. The vehicle according to claim 16, further comprising a longitudinal reinforcement attached to a top surface of the floor panel and extending from the transverse reinforcement toward a rear of the vehicle in a longitudinal direction of the vehicle.

19. The vehicle according to claim 18, further comprising:
- a front crossmember attached to the top surface of the floor panel, wherein the front crossmember is located behind the transverse reinforcement and extends along the width direction of the vehicle;
- a seat crossmember located behind the front crossmember; and
- vehicle seats mounted on the seat crossmember through mounting brackets.

20. The vehicle according to claim 19, wherein:
- a front end of the longitudinal reinforcement is joined to a center of the transverse reinforcement; and
- a rear end of the longitudinal reinforcement is joined to a center of the front crossmember.

\* \* \* \* \*